United States Patent [19]
Dixon

[11] 4,092,394
[45] May 30, 1978

[54] MANUFACTURE OF DRAUGHT EXCLUDERS

[75] Inventor: Bernard Dixon, Cambridge, England

[73] Assignee: Dixon International Limited, United Kingdom

[21] Appl. No.: 628,938

[22] Filed: Nov. 5, 1975

[51] Int. Cl.² ............................ D01D 5/12; D01F 11/00
[52] U.S. Cl. .................................... 264/210 R; 29/509; 29/514; 29/515; 29/243.57; 264/249; 15/250.36
[58] Field of Search ............ 29/509, 515, 514, 243.57; 264/177 R, 210 R, 249 X; 15/250.36

[56] References Cited

U.S. PATENT DOCUMENTS

| 2,266,394 | 12/1941 | Horton | 15/250.36 X |
| 2,310,177 | 2/1943 | Horton | 29/243.57 X |
| 2,343,843 | 3/1944 | Horton | 15/250.36 |
| 2,886,481 | 5/1959 | Swan | 264/249 X |
| 2,952,037 | 9/1960 | Ruck et al. | 264/210 R X |
| 3,125,192 | 3/1964 | Ramseur | 29/509 X |
| 3,430,994 | 3/1969 | Keeler | 264/177 R |
| 3,577,626 | 5/1971 | Link | 29/509 X |
| 3,670,399 | 6/1972 | George | 29/509 |
| 3,770,862 | 11/1973 | Rojahn | 264/210 R X |

FOREIGN PATENT DOCUMENTS

| 79,458 | 9/1955 | Netherlands. |
| 1,084,011 | 9/1967 | United Kingdom. |

Primary Examiner—Charlie T. Moon
Attorney, Agent, or Firm—Stevens, Davis, Miller & Mosher

[57] ABSTRACT

There is disclosed a process for assembling weather stripping which comprises continuously gaping the flanged mouth of an elongated holder inserting therein succeeding lengths of a foot portion of an elongate piece of weather stripping and thereafter continuously closing the flanged mouth to retain the weather stripping while it is in a relaxed state.

3 Claims, 7 Drawing Figures

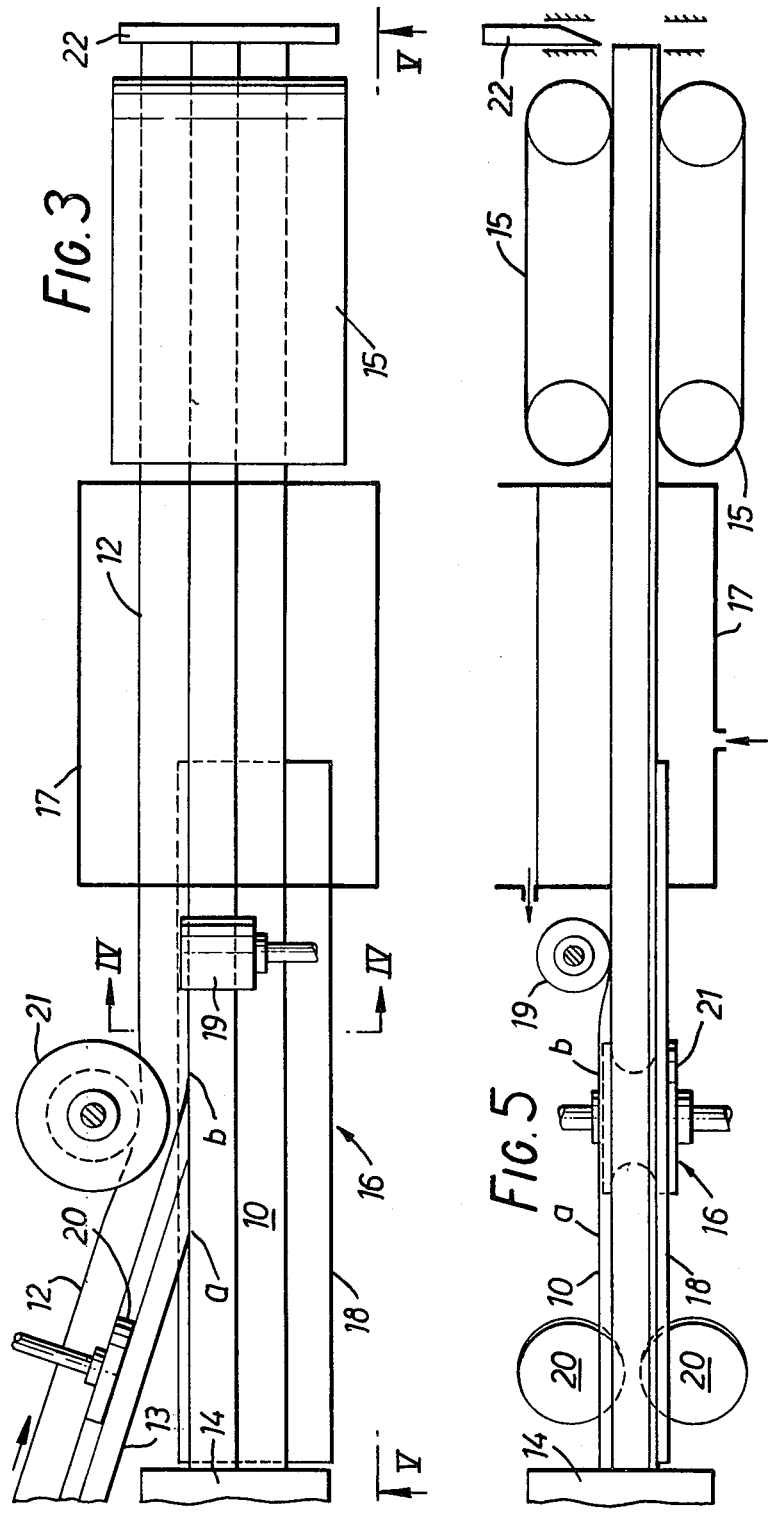

MANUFACTURE OF DRAUGHT EXCLUDERS

A draught excluder, consisting of an elongate holder holder and an elastomeric strip inserted and retained in a groove extending along the holder, is assembled by a process which minimises creep of the elastomer from the ends of the assembled excluder. Accordingly, preparatory to the insertion of the seal into the groove, the mouth of the groove is gaping, i.e. is of greater width than the foot of the seal, at the location on the holder where the seal is being inserted, and after insertion of the seal at said location the mouth is narrowed to retain the seal, the foot of the seal at said location being in a substantially relaxed state preparatory to narrowing of the mouth.

This invention relates to the manufacture of a draught excluder which consists of an elongate holder and an elastomeric strip inserted and retained in a groove extending along the holder, the elastomeric strip having a longitudinal foot portion, for example in the form of a bead or fin, in the groove, and a complementary longitudinal portion which protrudes from the groove. Such an excluder is hereinafter referred to as a draught excluder of the kind described.

The elastomer in some previous draught excluders is incidentally stretched in the course of assembly of the extruders. The elastomer, in recovering, creeps from the ends of the holders, which is objectionable.

With the aim of reducing such an objection, the present invention resides in a process of assembling a draught excluder of the kind described, in which, preparatory to the insertion of the seal into the groove, the mouth of the groove is gaping, i.e. is of greater width than the width of the foot of the seal, at the location on the holder where the seal is being inserted, and after insertion of the seal at said location the mouth is narrowed to retain the seal, the foot of the seal at said location being in a substantially relaxed state preparatory to narrowing of the mouth.

In the following examples, reference is made to the accompanying diagrams, in which:

FIG. 3 shows a plan of apparatus for carrying out the invention;

FIG. 5 is a side elevation seen from the line V—V in FIG. 3;

Figure 1:
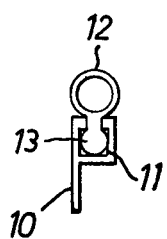
FIGS. 1 and 2 show end views of two forms of completed draught excluders.
Figure 2:
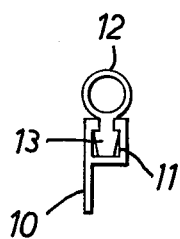

Referring to FIGS. 1 and 2, the holders of the respective draught excluders are indicated by reference 10. Each such holder 10 is of strip form and provides a longitudinal groove 11, internal flanges 11a defining between them the mouth of the groove. An elastomeric sealing strip 12, coextensive with the holder 10, is supported in the groove 11 by a foot 13, which may be of any convenient form, for example a longitudinal bead in FIG. 1, and a fin in FIG. 2. The foot 13 is retained in the groove 11 by the bead or fin on the foot, and by internal flanges 11a on the holder.

The holder 10 in the description of the accompanying Figures is of extrudable material, for example thermoplastics or aluminium. The elastomer may be neoprene or resilient plastics.

The apparatus shown in FIGS. 3 and 5 comprises a machine 14 for extruding the holder 10. The machine is aligned with the nip of a pair of haul-off belts 15, there being a forming device 16 and a cooling water bath 17 arranged between the extruding machine 14 and the belts 15. The device 16 comprises a plate 18 and free roller 19. A drive comprising rollers 20, one on each side of the strip 12, and a guide 21, which may be a freely rotatable grooved roller as shown, or a shoe, are arranged adjacent to the forming device 16 for respectively moving and guiding the elastomeric strip 12.

The holder strip 10 produced by the extruding machine 14 enters the forming device 16, which works at a temperature at which the holder material is malleable. The holder strip 10 emerges from the extruding machine 14 shaped by it to the section indicated by FIG. 4, namely with the mouth of the groove 11 gaping and the material still malleable. The form of the section is maintained up to the line IV—IV on FIG. 3, beyond which line the mouth of the groove is narrowed as later described.

Figure 4:
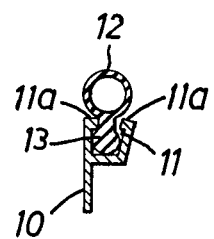
FIG. 4 is a transverse section of the draught excluder holder on the line IV—IV of FIG. 3.

FIG. 4 shows the mouth of the groove gaping to the extent that its width is somewhat greater than the full width of the foot 13 at the bead, so that the foot 13 is freely insertable.

The elastomeric strip 12 is driven in the direction of the arrow by the rollers 20 so that the strips 10, 12 converge and more at equal rates. The guide 21 is positioned so that the foot 13 is directed fully into the groove 11 as the strips 10, 12 progress. At the location on the holder 10 where the foot 13 is being inserted, i.e. at $a$–$b$ FIG. 3, the foot is in a substantially relaxed state, there being possibly a slight tension present because of the change in direction of the strip 12 at the roller 21 and because of the slight compression on the strip 12 by the guide roller 21.

The lower side of the holder strip 10 is supported for a short distance beyond the outlet of the machine 14 by the plate 18. The roller 19 acts on the upper side of the holder strip 10, which is in a malleable state, to narrow the mouth of the groove 11 to the extent that the foot 13 becomes retained by the flanges 11a, the position of the foot 13, and the section of the excluder, being apparent from FIGS. 1 and 2. The holder material is sufficiently cool and set as it leaves the roller 19 for the retention of the foot 13 to be maintained.

However, the water bath 17 into which the draught excluder, so assembled, is then passed, ensures that the holder material is stiffened or fully set before being drawn from the bath 17 by the action of the belts 15. The belts 15 deliver the excluder to a cutter 22, which severs the excluder into requisite lengths.

Should the holder 10 be of aluminium, the apparatus can be simplified by omission of the water bath 17.

Figure 6:
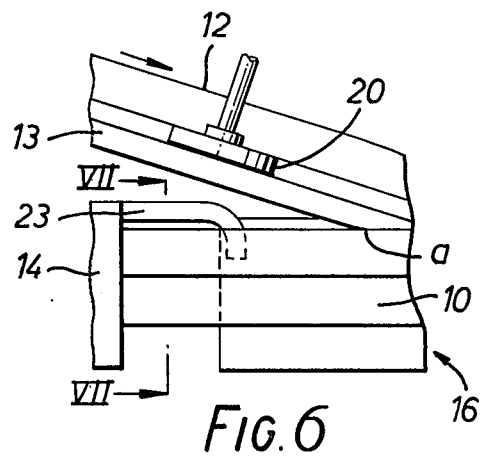
FIG. 6 is a fragmentary plan of an alternative form of the apparatus.

The alternative apparatus, of which part is shown in FIG. 6, is basically similar to that illustrated in FIGS. 3 and 5 and differs only in the section produced by the extruding machine 14 and in the employment of a member 23. The diagram of the alternative apparatus is therefore limited to illustrate principally the member 23, but reference should be made to FIGS. 1, 2 and 3 to 5 when previous reference numerals are used in the present description.

The extruding machine 14 in FIG. 6 employs a die corresponding to the final form of the holder shown in FIGS. 1 or 2.

Figure 7:
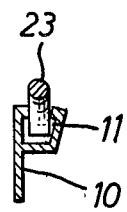
FIG. 7 is a transverse section of the holder part of the draught excluder, and of a member for widening the mouth of the holder groove, taken on line VII—VII of FIG. 6.

The member 23 (FIG. 6), conveniently a rod, is stiff and is firmly secured by one end to a rigid part of the apparatus, the machine 14 for example. The member 23 is cranked so that its other end, which is unsupported, projects into the groove 11 of the holder 10 as it emerges hot and malleable from the die. The width or diameter of the member 23 is greater than the width of the mouth of the holder groove 11 as formed by the die, and greater than the full width of the foot 13 of the elastomeric strip 12. The mouth is therefore widened locally to the member 23, to gape as in FIG. 7, the corresponding section of the holder being maintained between the member 23 to where the effect of roller 21 becomes operative, which is beyond the location a-b where the foot 13 is being inserted into the holder 10. Thus the foot 13 of the strip 12 is easily inserted by the action of the guide 21. The action of the roller 19 is to narrow the mouth of the groove 11 to the form apparent from FIGS. 1 or 2, with the result that the foot 13 is retained by the holder 10 as it progresses from the roller 19 through to the cutter 22, at which the holder 10 is cool and firm.

As in the operation of the apparatus described with reference to FIGS. 3 and 5, the elastomeric strip 12 and the holder 10 converge then move at equal linear rates throughout the alternative apparatus (FIG. 6). Consequently the foot 13 of the strip 12 is in a substantially relaxed state at the location a-b. Creep of the strip 12 from the ends of the holder 10 in the completed draught excluder is thereby less than it would be had the strip 12 been forced into the groove 11.

If the action of the forming device 16 causes the foot 13 to be held firmly in the groove 11, i.e. with no slippage along the holder, in the assembled condition, the creep is minimal even after operation of the cutter 22.

It is also possible to apply the present invention to a holder 10 which is resilient before assembly with the elastomer, and is of the section of the completed draught excluder, e.g. as in FIG. 1 or 2. A member corresponding in function to member 23 is applied to widen the mouth of the groove 11 to provide a location equivalent to location a-b for similar purpose. The equivalent of the forming device 16 and water bath 17 is not required but a guide is necessary to maintain the holder 10 in correct relation to the roller 21 and the haul-off belts 15. Because of the resilience of the holder 10, the effect of the member 23 on the holder diminishes progressively towards the belts 15, and beyond the location a-b the holder resiles and retains the foot 13.

The examples described envisage that the location at which the insertion and retention of the seal is taking place progresses along the holder. Such a procedure enables production on a continuous basis to be carried out conveniently.

I claim:

1. A process of assembling a draught excluder of the kind consisting of an elongate holder and a seal of elastomeric strip inserted and retained in a groove extending along the holder, the holder having internal flanges which define the mouth of the groove, the seal having a longitudinal foot portion in the groove, and a complementary longitudinal portion which protrudes from the mouth of the groove, the process comprising:

extruding the holder in malleable material and supporting the holder;

driving the seal per se towards the holder at the rate and in the sense of the holder being extruded;

guiding the driven seal to converge on the holder;

inserting the foot portion of the driven seal in a substantially relaxed state into the holder whilst the holder is in a malleable state from the extrusion the mouth of the groove gaping preparatory to the insertion of the foot portion of the seal into the groove, i.e., the mouth being of greater width than the foot portion of the seal at the location along the holder where the seal is being inserted; and, after insertion of the seal at said location, applying pressure on the holder on the side of the mouth whilst supporting the holder on the other side of the mouth and whilst the seal is in a substantially relaxed state, thereby to narrow the mouth to the extent that said foot portion and said internal flanges retain the seal;

moving progressively along the holder the location at which insertion and retention of the seal takes place; and severing a finished length of the draught excluder thus assembled, from the rest of the holder and the seal.

2. The process according to claim 1, comprising:

extruding the holder in thermoplastics material; and after narrowing said mouth to said extent, cooling and thereby setting the mouth.

3. The process according to claim 1 wherein said groove is of part-rectangular cross-section and said foot portion is of rounded cross-section.

* * * * *